Patented Nov. 4, 1952

2,616,879

UNITED STATES PATENT OFFICE 2,616,879

PRODUCTION OF POLYMERIZED VINYL ALKYL ETHERS

Abraham Oscar Zoss, Easton, Pa., assignor to General Aniline & Film Corporation, New York, N. Y., a corporation of Delaware No Drawing. Application July 2, 1946, Serial No. 681,129

12 Claims. (Cl. 260—91.1)

This invention relates to the production of resilient, rubberlike polymers, more particularly from vinyl alkyl ethers.

Polymerization of vinyl ethers, among them vinyl methyl ether, by means af acid-reacting catalysts has been described in U. S. P. 2,104,000. The products obtainable by the process of this patent which is to be carried out at temperatures of about 10° C. and above are neither crystalline nor form-stable, rubbery polymers but range from liquid to semi-solid products lacking in physical properties as substitutes for rubber.

I have found that by carrying out the polymerization of a vinyl ether using a hydrogen-containing halogenated alkane as the diluent at temperatures maintained below about −30° C. rubber-like, form-stable polymers which are tough, resilient and non-tacky solids are obtained.

The vinyl ethers which can advantageously be polymerized in accordance with the process of this invention include the lower alkyl vinyl ethers, e. g., methyl vinyl ether, ethyl vinyl ether, propyl vinyl ether, isopropyl vinyl ether, butyl vinyl ether, isobutyl vinyl ether and secondary and tertiary butyl vinyl ethers. Particularly valuable results are obtained when vinyl alkyl ethers in which the alkyl radical contains from 1 to 2 carbons are polymerized according to my process, since vinyl methyl ether and vinyl ethyl ether do not polymerize readily at temperatures below −30° C. when the diluents disclosed in the prior art are employed. My process is also operative for the polymerization of other vinyl ethers such as those disclosed in U. S. P. 2,104,000.

It is essential that the temperature of the polymerization reaction be maintained below the aforesaid limit, as at temperatures thereabove the vinyl ether is polymerized to lower molecular weight products which are either too tacky or are not form-stable. In general the polymerization is carried out at temperatures between −70° C. and −60° C. since best results are obtained within this temperature range. However, temperatures as high as −30° C. can be employed with some sacrifice in quality of the polymer.

To the attainment of the end that the reaction temperature of the polymerization is maintained below the afore-mentioned limit, the reactants and other materials employed in the process are brought together under precooled conditions, preferably at temperatures below −70° C., below which temperature little or no polymerization occurs. By this method, the reactants can be premixed and the temperature then raised to above −70° C. to effect the polymerization. If desired, the catalyst can be added to the mixture of vinyl ether monomer and the hydrogen-containing halogenated alkane gradually and in small amounts with continuous stirring while maintaining the temperature above −70° C. By so controlling the conditions of the reaction, a smooth and even rate of reaction is attained which is conducive to the maintenance of the necessary low reaction temperatures.

Any suitable means of refrigeration may be employed for cooling of the reaction, for example, solid carbon dioxide may be fed periodically to the reaction mixture, or part of the liquid diluent may be allowed to vaporize by application of a vacuum to the reaction, the diluent being condensed and recycled to the reaction vessel or a liquid refrigerant, such as chilled ethylene, may be circulated about the reaction vessel, or a combination of these means may be employed. The polymerization can also be carried out under superatmospheric pressure, particularly when a diluent, such as ethane which boils below −70° C., is employed. In general the reaction is carried out at atmospheric pressure.

Hydrogen-containing halogenated alkanes which can be employed include methyl chloride, methylene chloride, chloroform, monochlorodifluoromethane, ethyl chloride, ethylene dichloride, ethylidene dichloride and the like. Other hydrogen-containing halogenated alkanes can be employed in the process of the invention, especially those having freezing points below −30° C. Particularly valuable results are obtained when hydrogen-containing chlorinated alkanes of one to two carbon atoms are used. The quantity of hydrogen-containing halogenated alkane employed as the diluent can be varied over a wide range. In general higher yields of polymer are obtained when from one to five moles of hydrogen-containing halogenated alkane per mole of vinyl ether are employed. Larger amounts of diluent can be used but at a sacrifice in economy due to the cost of recovery of the diluent.

The hydrogen-containing halogenated alkane diluents may be used in admixture with other suitable diluents, for example, liquid or liquefiable hydrocarbons, e. g., ethane, propane, butane, toluene, m-xylene, saturated ethers, e. g., methyl ether, ethyl ether, butyl methyl ether, butyl ethyl ether and the like. The use of mixtures of diluents is particularly desirable when the hydrogen-containing halogenated alkane employed freezes at temperatures above that employed for the polymerization of the vinyl ether. Mixtures of diluents in which the polymer is insoluble can advantageously be used to effect the precipitation of the polymer as formed from the solution as illustrated in Example II.

As catalysts for effecting the polymerization, acid-reacting condensing agents such as tin tetrachloride, stannic chloride, aluminum chloride, gallium trichloride, boron trifluoride and the like may be employed. For best results, the use of boron fluoride or its addition products with organic oxygen-bearing compounds, such as ethers, more particularly the addition products of the dialkyl ethers, such as boron fluoride diethyl ether and boron fluoride dibutyl ether, are recommended. The addition compounds of boron fluoride may suitably be dissolved in a further quantity of the organic oxygen-bearing compound forming part thereof, e. g., the dialkyl ethers. The quantities of catalyst used are generally between 0.001 and 10 per cent by weight of the vinyl ether. For best results catalyst quantities within the range of 0.08 to 5 per cent are employed.

Completion of the reaction may be determined by the absence of heating or discoloration in a sample of the reaction mixture to which a small portion of the catalyst has been added. Where the addition compounds or organic oxygen-bearing compounds with boron fluoride are used, it is recommended that they be drawn from such as have been distilled under vacuum and freshly made or stored under refrigeration as such measures insure greater retention of their catalytic activity.

It is desirable to conduct the polymerization in the essential absence of oxygen, that is, in an atmosphere of an inert gas such as nitrogen or carbon dioxide, the latter being conventionally provided by the addition of solid carbon dioxide to the reaction mixture followed by venting for removal of air.

When the polymerization has been finished, the catalyst is inactivated or quenched by working the polymer with substances which bind or otherwise stop the activity of the catalyst, for example, aqueous solutions of alkaline-reacting substances, such as ammonium hydroxide, sodium hydroxide, potassium hydroxide, methyl amine, ethyl amine, propyl amine, and the like. Organic hydroxyl and carbonal compounds, for example, methanol, acetone, etc., are also effective quenching agents. Preferably, the quenching agent is precooled to the low reaction temperatures, the reaction mixture also being maintained at these temperatures to insure against the formation of undesirable lower molecular weight polymers from any unreacted monomer. The rubbery polymer is then separated from the reaction mixture by evaporation of the diluent, filtration, or by precipitation by means of a nonsolvent, further washed, if desired, with a nonsolvent for the polymer to remove residual impurities, and subjected to a low temperature drying operation, for example, at moderately elevated temperatures under a vacuum.

The vinyl ether employed in the polymerization may be that obtained from the reaction of acetylene and an alcohol. In such case it is necessary to free it from the residual alcohol and any aldehyde and other impurities by washing with water and then drying by allowing it to stand over sodium or powdered potassium hydroxide for about 24 hours and finally fractionally distilling it from the solid treating agent. One precise fractional distillation is generally sufficient.

The rubbery, form-stable polymer of vinyl methyl ether of my invention is soluble in aromatic hydrocarbons, chlorinated hydrocarbons, alcohols, ketones, ethers and esters, for example, in benzene, chlorobenzene, methanol, ethanol, acetone, dioxane, ethyl ether, ethyl acetate, etc., and in water at temperatures below about 35° C.

The invention is further illustrated by the following specific examples to which, however, it is not to be limited. Parts are by weight.

Example I

A reactor fitted with a stirrer, thermometer, means for adding the catalyst and a vent was cooled in a solid carbon dioxide-methanol bath and 20 parts of liquefied methyl vinyl ether and 80 parts of methylene chloride were added. To this mixture was added with stirring 0.2 part of boron fluoride diethyl ether complex while maintaining the mixture at −74° C. The temperature was then raised to and maintained at −70° C. for 1 hour during which time polymerization occurred. A precooled mixture of 40 parts of methanol and 5 parts of concentrated ammonium hydroxide was then added with stirring and the contents of the reactor allowed to come to room temperature. The insoluble inorganic products were then removed by filtration, the methylene chloride evaporated and polyvinyl methyl ether precipitated by the addition of water heated to above 35° C. After drying, an excellent yield of transparent, colorless, tough, resilient, rubbery, form-stable polymer was obtained. X-ray examination of the polymer gave a crystalline X-ray diffraction pattern in contrast to a non-crystalline X-ray diffraction pattern for methyl vinyl ether polymers prepared by the method of U. S. P: 2,104,000–2,104,002.

Similar results are obtained when methyl chloride and ethyl chloride are used as the diluent in place of methylene chloride.

Example II

A reactor similar to that described in Example I was cooled by means of a bath containing a mixture of solid carbon dioxide and methanol. To this reactor was added 116 parts of liquefied methyl vinyl ether, 170 parts of methylene chloride and 294 parts of liquefied propane. During a period of 40 minutes, 4 parts of boron trifluoride-diethyl ether complex was added to the stirred mixture at such a rate so as to maintain the temperature within the range of −65° to −60° C. The polymer precipitated as formed from the solution in the form of a white solid mass. When the polymerization was complete, a precooled mixture of 100 parts of methanol and 60 parts of concentrated ammonium hydroxide was added with stirring, and the polymer separated. Essentially a quantitative yield of non-sticky, chlorine-free, form-stable rubbery polyvinyl methyl ether was obtained.

Example III

Using the procedure as described in Example I except that 80 parts of monochlorodifluoromethane was used in place of methylene chloride, a good yield of tough, resilient, non-tacky, form-stable, rubbery polyvinyl methyl ether was obtained.

If dichlorodifluoromethane or carbon tetrachloride is used as the diluent under similar conditions, only a trace of low molecular weight, sticky polymer is obtained.

Example IV

A reactor similar to that described in Example I was cooled by means of a liquid nitrogen bath and 36 parts of vinyl ethyl ether, 43 parts of methylene chloride and 102 parts of liquefied propane was added. To this mixture was added slowly with stirring 0.25 part of boron fluoride-diethyl ether complex. The temperature of the mixture was then increased to −70° C. and maintained within the range of −70° to −65° C. for 1 hour. Ten parts of precooled concentrated ammonium hydroxide was then added with stirring and the solid phase separated and dried under vacuum. There was thus obtained a tough, granular, rubbery, form-stable vinyl ethyl ether polymer.

The polymers of my invention are in properties and appearance similar to rubber, being elastic, flexible and non-sticky, form-stable, high molecular weight solids. They may exhibit tack when brought into pressure contact with other surfaces. They may be worked on a mill for compounding purposes, cast from solution for laminating and coating purposes and for the production of transparent sheets, may be extruded or pressure molded, and employed as pressure adhesives and electrical insulators and for imparting strength and flexibility to waxes, paraffins and brittle plastic materials.

I claim:

1. In a process of preparing polymeric vinyl alkyl ethers wherein the vinyl alkyl ether is polymerized in the presence of a liquid organic diluent and a small amount of a boron fluoride compound, the improvement which comprises conducting the polymerization at a temperature in the range −70° C. to −30° C. in the presence of a liquid organic diluent comprising essentially a hydrogen-containing halogenated alkane.

2. A process as defined in claim 1, wherein the vinyl ether is a lower alkyl vinyl ether and the boron fluoride compound is boron fluoride.

3. A process as defined in claim 1, wherein the vinyl ether is a lower alkyl vinyl ether and the boron fluoride compound is the addition product of boron fluoride and a dialkyl ether.

4. A process as defined in claim 1, wherein the boron fluoride compound is the addition compound of boron fluoride and diethyl ether.

5. A process as defined in claim 1, wherein the vinyl alkyl ether to be polymerized contains 1 to 2 carbon atoms in the alkyl radical thereof.

6. A process as defined in claim 5, wherein the hydrogen-containing halogenated alkane is methylene chloride.

7. A process as defined in claim 5, wherein the acid-reacting condensing agent is boron fluoride.

8. A process as defined in claim 5, wherein the acid-reacting condensing agent is the addition product of boron fluoride and a dialkyl ether.

9. A process as defined in claim 5, wherein the acid-reacting condensing agent is the addition compound of boron fluoride and diethyl ether.

10. A process of polymerizing vinyl methyl ether which comprises preparing at a temperature below −70° C., a liquid mixture comprising vinyl methyl ether, a hydrogen-containing chlorinated alkane of 1 to 2 carbon atoms and an acid-reacting condensing agent, and then effecting the polymerization of the vinyl methyl ether within the temperature range of −70° C. to below −30° C.

11. A process as defined in claim 10, wherein the hydrogen-containing chlorinated alkane is methylene chloride and the acid-reacting condensing agent is the addition compound of boron fluoride and diethyl ether.

12. A process as defined in claim 10, wherein the polymerization is effected within the temperature range of −70° C. to −60° C.

ABRAHAM OSCAR ZOSS.

REFERENCES CITED

The following references are of record in the file of this patent:

UNITED STATES PATENTS

| Number | Name | Date |
|---|---|---|
| 2,061,934 | Cunradi | Nov. 24, 1936 |
| 2,104,000 | Reppe | Dec. 28, 1937 |
| 2,108,994 | Reppe et al. | Feb. 22, 1938 |
| 2,223,171 | Gaylor | Nov. 26, 1940 |
| 2,243,658 | Thomas | May 27, 1941 |
| 2,379,656 | Ruthruff | July 3, 1945 |
| 2,457,661 | Grosser | Dec. 28, 1948 |
| 2,513,820 | Schildnecht | July 4, 1950 |